US010469892B2

United States Patent
Herz

(10) Patent No.: US 10,469,892 B2
(45) Date of Patent: *Nov. 5, 2019

(54) GESTURE-BASED MULTIMEDIA CASTING AND SLINGING COMMAND METHOD AND SYSTEM IN AN INTEROPERABLE MULTIPLE DISPLAY DEVICE ENVIRONMENT

(71) Applicant: DVDO, Inc., Santa Clara, CA (US)

(72) Inventor: William S Herz, Hayward, CA (US)

(73) Assignee: DVDO, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/703,723

(22) Filed: Sep. 13, 2017

(65) Prior Publication Data

US 2018/0074594 A1  Mar. 15, 2018

Related U.S. Application Data

(60) Provisional application No. 62/394,146, filed on Sep. 13, 2016.

(51) Int. Cl.
*G06F 3/01* (2006.01)
*H04N 21/41* (2011.01)
(Continued)

(52) U.S. Cl.
CPC ......... *H04N 21/4126* (2013.01); *G06F 3/017* (2013.01); *G06F 3/0346* (2013.01);
(Continued)

(58) Field of Classification Search
CPC ...... G06F 3/017; G06F 3/0485; G06F 3/0488; G06F 3/0346; H04N 21/42224;
(Continued)

(56) References Cited

U.S. PATENT DOCUMENTS

2013/0169546 A1* 7/2013 Thomas ................ G06F 9/4451
345/173
2014/0109144 A1* 4/2014 Asnis ............... H04N 21/43615
725/48

(Continued)

*Primary Examiner* — Ricky Chin
*Assistant Examiner* — Akshay Doshi
(74) *Attorney, Agent, or Firm* — Invent Capture, LLC.; Samuel S. Cho

(57) ABSTRACT

Novel gesture-based multimedia casting and slinging command methods and systems that are configured to accommodate seamless multimedia data and playback transfers across various electronic devices in a multiple display device environment are disclosed. In one instance, a "casting" of an audio/video (AV), graphical, or photographic multimedia content from a touch-screen electronic device to a targeted device (e.g. a television, another portable electronic display device, a cast-sling box, etc.) is intuitively represented by a finger swipe-up gesture command because a finger swipe-up motion mimics a physical motion of pushing, throwing, or sending an item from the touch-screen electronic device to the targeted device. In another instance, a "slinging" of an audio/video (AV), graphical, or photographic multimedia content from the targeted device is intuitively represented by a finger swipe-down gesture command because a finger swipe-down motion mimics a physical motion of "pulling-in" or receiving an item into the touch-screen electronic device.

11 Claims, 7 Drawing Sheets

An Embodiment of "Cast" Command Pathways in an Interoperable Multiple Display Device Environment with Novel Cast-Sling Boxes (CSB's)

(51) Int. Cl.
*H04N 21/462* (2011.01)
*H04N 21/436* (2011.01)
*H04N 21/422* (2011.01)
*H04N 21/482* (2011.01)
*G06F 3/0346* (2013.01)

(52) U.S. Cl.
CPC ..... *H04N 21/42224* (2013.01); *H04N 21/436* (2013.01); *H04N 21/4622* (2013.01); *H04N 21/482* (2013.01)

(58) Field of Classification Search
CPC ............... H04N 21/482; H04N 21/436; H04N 21/4622; H04N 21/4126
See application file for complete search history.

(56) References Cited

U.S. PATENT DOCUMENTS

| | | | |
|---|---|---|---|
| 2015/0193069 A1* | 7/2015 | Di Censo | G06F 3/017 345/173 |
| 2015/0312508 A1* | 10/2015 | Phang | H04N 5/45 348/552 |
| 2016/0057203 A1* | 2/2016 | Gardenfors | H04M 1/7253 455/566 |

* cited by examiner

A Preferred Embodiment of Gesture-based Multimedia Casting and Slinging Command Methods

100

Visual Representation of Sling and Cast Gesture Commands and Execution Processes

200

An Embodiment of Cast/Sling Command Processing Modules in a Command-Initiating Device and a Command-Receiving Device

300

A Hardware Block Diagram Example of a Cast/Sling Command-Initiating or Cast/Sling Command-Receiving Device

400

An Embodiment of "Cast" Command Pathways in an Interoperable Multiple Display Device Environment with Novel Cast-Sling Boxes (CSB's)

500

An Embodiment of Multiple "Cast" Commands by a Plurality of Cast-Initiating Devices to a Large Display Panel via a Novel Cast-Sling Box (CSB-1)

600

An Embodiment of "Sling" Command Pathways in an Interoperable Multiple Display Device Environment with a Novel Cast-Sling Box (CSB)

700

GESTURE-BASED MULTIMEDIA CASTING AND SLINGING COMMAND METHOD AND SYSTEM IN AN INTEROPERABLE MULTIPLE DISPLAY DEVICE ENVIRONMENT

BACKGROUND OF THE INVENTION

The present invention generally relates to communicating multimedia data among a plurality of electronic devices. More specifically, the invention relates to one or more systems and methods for relaying, sharing, authorizing, rendering, and recording visual, textual, graphical, and/or audible multimedia information in an interoperable multiple display device environment. Furthermore, the invention also relates to novel user gesture commands for transmitting, receiving, sharing, authorizing, and recording displayable and/or audible multimedia information in an interoperable multiple display device environment.

Various consumer electronic devices in today's digital age are capable of downloading, executing, or uploading multimedia information. For example, smart phones, tablet computers, notebook computers, and Internet-connected "smart" televisions in recent years are frequently utilized for video and audio download, upload, and playback in a broadband data network-connected environment. As more consumers own and simultaneously operate a plurality of multimedia data-executable electronic devices in a typical home or office environment, seamless, immediate, and convenient multimedia data transmission, reception, recording, playback authorizations, and playback among the consumer's plurality of multimedia data-executable electronic devices are increasingly becoming more important and desirable. Unfortunately, a satisfying level of seamless, immediate, and convenient multimedia data sharing and playback interoperability among various electronic devices in a real-life home or office environment is difficult to achieve due to various factors. For example, system software or communication protocol incompatibilities among various electronic devices, misconfigured digital rights management (DRM) programs, and hardware incompatibilities among a plurality of electronic devices often prevent seamless sharing or playback of multimedia data among various devices that a consumer operates in today's home or office environment.

Furthermore, conventional user command methods and user interfaces for transmitting or receiving multimedia data from one device to another in today's home or office environment typically require fidgeting with both transmitting and receiving devices and various device settings to establish interoperable multimedia data communications. A cumbersome current state of the art in configuring the multiple device interoperability discourages a typical consumer from making any available multimedia playback devices fully interoperable for multimedia data transfer, sharing, and playback in a typical home or office environment.

Therefore, it may be advantageous to devise a novel intermediary set-top box that can provide seamless, immediate, and convenient interoperability and multimedia data transfer among a plurality of electronic devices in a multiple display device environment. Furthermore, it may also be advantageous to devise a set of novel, intuitive, and simplified user gesture commands executed on an electronic device for seamless multimedia data transfer and playback across various electronic devices in a home or office multiple display device environment.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a gesture-based multimedia casting and slinging command device is disclosed. This device comprises: a cast and sling processing module incorporating a user gesture interpreter, a sling gesture command encoder, and a cast gesture command encoder, wherein the user gesture interpreter determines a user's finger swipe-down gesture as a multimedia sling command from a targeted device to the gesture-based multimedia casting and slinging command device, and wherein the user gesture interpreter further determines the user's finger swipe-up gesture as a multimedia cast command from the gesture-based multimedia casting and slinging command device to the targeted device; the sling gesture command encoder configured to encode the multimedia sling command as a multimedia inbound transfer from the targeted device and a localized playback at the gesture-based multimedia casting and slinging command device; the cast gesture command encoder configured to encode the multimedia cast command as a multimedia outbound transfer to the targeted device and a remote playback at the targeted device; a touchscreen sensor interface, a graphics unit, and a touchscreen display unit operatively connected to the cast and sling processing module to receive, convert, and transmit at least one of the user's finger swipe-down gesture and the user's finger swipe-up gesture as electrical signals to the cast and sling processing module; and a CPU or an APU connected to a memory unit, the touchscreen sensor interface, the graphics unit, the touchscreen display, and the cast and sling processing module, wherein the CPU or the APU is further configured to execute one or more components from the cast and sling processing module.

DETAILED DESCRIPTION

Figure 1:
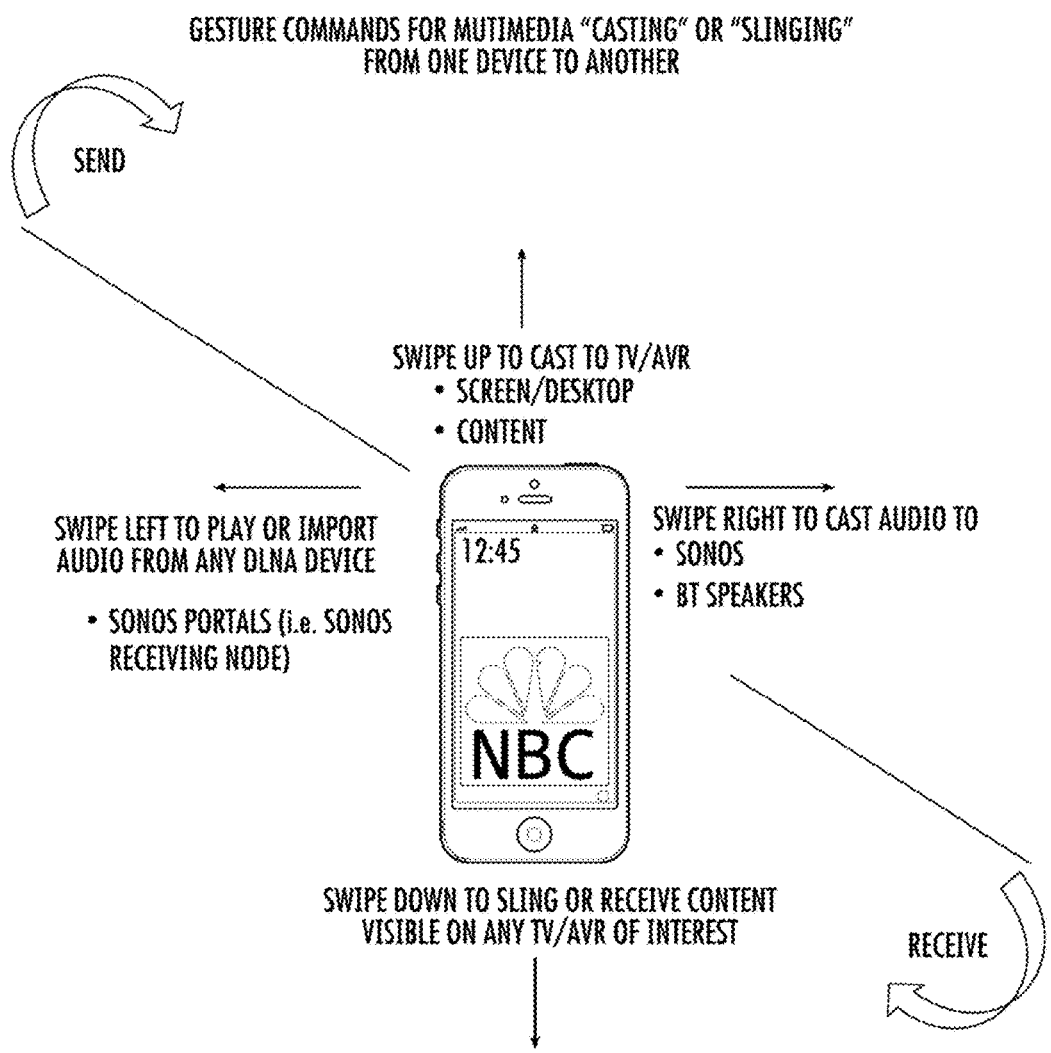
FIG. 1 shows a preferred embodiment of gesture-based multimedia casting and slinging command methods executed on a touch-screen electronic device, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of procedures, logic blocks, processing, and/or other symbolic representations that directly or indirectly resemble gesture-based multimedia casting and slinging command methods and systems in an interoperable multiple display device environment. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term referred to as "cast," or "casting," is defined as an act of transmitting or "pushing" a multimedia content (e.g. audio, video, photos, computer-generated graphics, screen mirroring, user interface, etc.) from one electronic device to another electronic device. Furthermore, a "casting" device is defined as an electronic device executing a multimedia data transmission application for sending a multimedia content to another electronic device, which is configured to receive, playback, and/or record the transmitted multimedia content. In a preferred embodiment of the invention, a casting command and a corresponding multimedia data transmission process are executed in a mobile operating system (e.g. Android, iOS, etc.) environment or a computer operating system (e.g. Windows, Mac OS X, Chrome OS, etc.) environment, or a server/cloud environment. In one embodiment, casting can accommodate real-time outbound streaming of multimedia or IoT data to a targeted electronic device for immediate playback or recording. In another embodiment, casting can accommodate an outbound file transfer to the targeted device.

Moreover, for the purpose of describing the invention, a term referred to as "sling," or "slinging," is defined as an act of requesting, "pulling," receiving, and/or rendering a multimedia content (e.g. audio, video, photos, computer-generated graphics, UI, etc.) from a targeted electronic device. Furthermore, a "slinging" device is defined as an electronic device executing a multimedia data rendering application that requests, receives, and plays a multimedia content transmitted from another electronic device after an on-demand request by a user. In a preferred embodiment of the invention, a slinging command and corresponding multimedia data request, receipt, and rendering processes are executed in a mobile operating system (e.g. Android, iOS, etc.) environment or a computer operating system (e.g. Windows, Mac OS X, Chrome OS, etc.) environment. In one embodiment, slinging can accommodate real-time streaming-in of multimedia or IoT data from a content source device for immediate playback or recording in a sling-initiating device. In another embodiment, slinging can accommodate file transfer-in from the content source device.

In addition, for the purpose of describing the invention, a term referred to as "cast-sling box," or "CSB," is defined as a novel electronic set-top box configured to provide at least three primary functions in a single set-top box unit: casting, slinging, and digital recording with full-duplex time shifting (i.e. concurrent independent recording and playback). In a preferred embodiment of the invention, a CSB is configured to act as an intermediary device among a variety of electronic devices for seamless, immediate, and convenient device interoperability in casting, slinging, displaying, and recording multimedia data. In some instances, the CSB is also configured to transcode multimedia data to provide seamless multimedia data format compatibility among the variety of electronic devices. Yet in some other instances, the CSB provides a novel feature called "referral mode," which is configured to overcome inter-device multimedia content transfer restrictions often imposed by a DRM by incorporating an automated and seamless capability to log into a user's DRM-authorized online content service account upon a user's inter-device content transfer request (e.g. a cast or sling request), and then streaming-in or downloading (e.g. file transferring) the DRM-authorized content directly from the online content service provider to the CSB over the Internet or another cloud-based wide-area network (WAN). The CSB can then fulfill the user's inter-device content transfer request by directing the streamed-in or downloaded DRM-authorized content to a target device.

Furthermore, the "referral mode" may also be utilized to accommodate seamless communication among an IoT device (e.g. a Nest device or sensor), an IoT device online access account (e.g. a Nest app, a Nest online device control account, etc.), and a user's consumer electronic device (e.g. a smart phone, a tablet computer, etc.) that are intermediated by the CSB. In such instances, the CSB can automatically and seamlessly log into the IoT device online access account and transfer information between the IoT device online access account and the CSB, which in turn transmits user-requested IoT information to the user's consumer electronic device.

Examples of electronic devices that can be connected to and intermediated by the CSB include, but are not limited to, a smart phone, a tablet computer, a notebook computer, a wearable electronic device, an optical disc player (e.g. a Blu-ray or DVD player), a cable TV or satellite TV set-top box, a game console, and a conventional media storage and playback device (e.g. a time-shifting module integrated into or connected to a television).

Furthermore, for the purpose of describing the invention, a term "cloud," "cloud network," or "cloud computing" is defined as a data network environment in which data from an electronic system operatively connected to the data network environment is typically stored in a network-attached storage, instead of a local storage of the electronic system. In one example, the data from the electronic system may be stored in both the local storage of the electronic system as well as the network-attached storage by default. In another example, the data from the electronic system may only be stored in the network-attached storage by default without storing any data permanently in the local storage of the electronic system, other than utilizing a temporary local buffer of the electronic system.

Moreover, for the purpose of describing the invention, a term "electronic system" is defined as an electronic-circuit hardware device such as a computer system, a computer server, a multimedia information-processing set-top box, a handheld device (e.g. a cellular phone, a tablet computer, a portable gaming device, etc.), a wearable electronic device (e.g. an electronic goggle with an embedded display, a smart watch, an implantable electronic device, etc.), a visual monitoring system, or another electronic-circuit hardware device.

In general, one or more embodiments of the invention relate to user control interfaces for initiating and processing multimedia data among a plurality of electronic devices. More specifically, one or more embodiments of the invention relate to providing gesture-based multimedia casting and slinging command methods in an interoperable multiple display device environment.

Furthermore, some embodiments of the invention relate to electronic systems that execute user gesture-based multimedia casting and slinging commands in an interoperable multiple display device environment. A preferred embodiment of the invention may include a novel cast-sling box that acts as an intermediary device for seamless multimedia data transfer and playback interoperability among a plurality of display devices.

An objective of an embodiment of the present invention is to provide a set of intuitive user gesture commands executed on an electronic device that enable simplified and seamless interoperability and multimedia data transfers among a plurality of electronic devices in a multiple display device environment.

Another objective of an embodiment of the present invention is to provide a novel intermediary set-top box called a "cast-sling box" (CSB) that uniquely incorporates multimedia data casting, slinging, transcoding, referring, rendering, and recording capabilities for seamless interoperability of various electronic devices in a multiple display device environment.

FIG. 1 shows a preferred embodiment of gesture-based multimedia casting and slinging command methods executed on a touch-screen electronic device (100), in accordance with an embodiment of the invention. In this preferred embodiment of the invention, a multimedia casting and slinging command user interface application is executed on the touch-screen electronic device (100), as shown in FIG. 1. In one example, the multimedia casting and slinging command user interface application may be a mobile application executed on a smart phone, a tablet computer, a portable game console, a wearable electronic device (e.g. an electronic goggle, a smart watch, etc.), or another portable electronic device. In another example, the multimedia casting and slinging command user interface application may be a desktop or notebook computer application operating on a Windows, MAC OS X, or another personal computer operating system.

In the preferred embodiment of the invention, a user command to initiate "casting" of an audio/video (AV), graphical, or photographic multimedia content from the touch-screen electronic device (100) to a targeted device (e.g. a television, another portable electronic display device, a cast-sling box, etc.) is a finger swipe-up gesture command, as shown in FIG. 1. The swipe-up gesture may be particularly intuitive for a "casting" command that initiates multimedia content transmission because a finger swipe-up motion mimics a physical motion of pushing, throwing, or sending an item from the touch-screen electronic device (100) to the targeted device. In particular, the user may feel that the finger swipe-up gesture for multimedia casting initiation is akin to "throwing" the content towards a targeted device (e.g. towards a television in the same room, a nearby portable electronic device with a display panel, a cast-sling box which further executes casting to an end destination device, etc.).

Furthermore, in the preferred embodiment of the invention, a user command to initiate "casting" of an audio content to wireless speakers (e.g. Bluetooth-enabled speakers) or to a wirelessly-networked audio system (e.g. Sonos devices on SonosNet) from the touch-screen electronic device (100) is a finger swipe-right gesture command, as shown in FIG. 1. In an alternate embodiment of the invention, this user command may be performed by a finger swipe-left gesture command or another directional swipe command (e.g. a diagonal swipe, a circular swipe, or a finger swiping motion of another shape) instead. In some embodiments, extra user input variables, such as magnitudes of speed and/or pressure during a finger swipe, can also be utilized to define and determine a casting gesture command Defining a cast-initiating command with extra user input variables may be particularly useful, if simple directional swipe commands are already universally utilized for other purposes at the operating system level. Moreover, in some embodiments of the invention, multi-touch gesture commands with two or more finger touch on a touchscreen interface can define one or more casting commands. In addition, sound tone changes (e.g. an ascending tone, a descending tone, a bump sound, a drum beat, etc.) or varying intensity of vibration can serve as a localized user feedback to indicate a boundary, an end of a range for communication, or a task progress associated with one or more casting commands.

In the preferred embodiment of the invention, the multimedia casting and slinging command user interface application executed on the touch-screen electronic device (100) also provides gesture-based commands to initiate "slinging" (i.e. requesting, receiving, playing, and/or storing) of multimedia contents from a targeted device. As shown in FIG. 1, a user command to initiate "slinging" of an audio/video (AV), graphical, or photographic multimedia content from the targeted device (e.g. a television, another portable electronic display device, a cast-sling box, etc.) is a finger swipe-down gesture command. The swipe-down gesture may be particularly intuitive for a "slinging" command that initiates multimedia content transfer-in request and reception from the targeted device to the touch-screen electronic device (100) because a finger swipe-down motion mimics a physical motion of "pulling-in" or receiving an item into the touch-screen electronic device (100). In particular, the user may feel that the finger swipe-down gesture for multimedia slinging initiation is akin to "bringing" the content towards the user from a targeted device.

Moreover, in the preferred embodiment of the invention, a user command to initiate "slinging" (i.e. requesting, receiving, playing, and/or storing) of an audio content from a targeted device to the touch-screen electronic device (100) is a finger swipe-left gesture command, as shown in FIG. 1. The targeted device may be a peer-to-peer device configured to transmit the audio content directly to the touch-screen electronic device (100) upon request from a user, who initiates the audio content sling procedure via the finger swipe-left gesture command. Alternatively, the targeted device may be a networked device (e.g. a computer server executing an audio library, a Sonos-receiving node, another wirelessly-networked device, etc.) capable of transmitting the audio content to the touch-screen electronic device (100) via a wireless network, if the user makes the audio content sling request with the finger swipe-left gesture command.

Furthermore, in an alternate embodiment of the invention, this user command may be performed by a finger swipe-right gesture or another directional swipe command (e.g. a diagonal swipe, a circular swipe, or a finger swiping motion of another shape) instead. In some embodiments, extra user input variables, such as magnitudes of speed and/or pressure during a finger swipe, can also be utilized to define and determine a slinging gesture command Defining a sling-initiating command with extra user input variables may be particularly useful, if simple directional swipe commands are already universally utilized for other purposes at the operating system level. Moreover, in some embodiments of the invention, multi-touch gesture commands with two or more finger touch on a touchscreen interface can define one or more slinging commands. In addition, sound tone changes (e.g. an ascending tone, a descending tone, a bump sound, a drum beat, etc.) or a varying intensity of vibration can serve as a localized feedback to indicate a boundary, an end of a range for communication, or a task progress associated with one or more slinging commands.

Furthermore, swipe commands or other user gesture commands can also be utilized for halting or terminating a casting or slinging process. For example, in some embodiments of the invention, a swipe-left gesture can be construed as a user command to terminate an ongoing casting process, while a swipe-right gesture can be construed as a user command to terminate an ongoing slinging process.

The preferred embodiment of the invention, as described above and as shown in FIG. 1, does not limit the scope of other embodiments of the invention, which may utilize different finger swipe patterns, arrangements, or other user gestures for correlating casting and slinging initiations with gesture-based user commands executed on the touch-screen electronic device (100). Furthermore, the touch-screen electronic device (100) may be a portable electronic device (e.g. a smart phone, a tablet computer, a notebook computer, a portable gaming device, etc.), a wearable electronic device with an embedded display unit, or a display unit connected to a television, a computer server, a kiosk, or another less portable electronic system, which may be utilized in a connected home or office environment.

Figure 2:
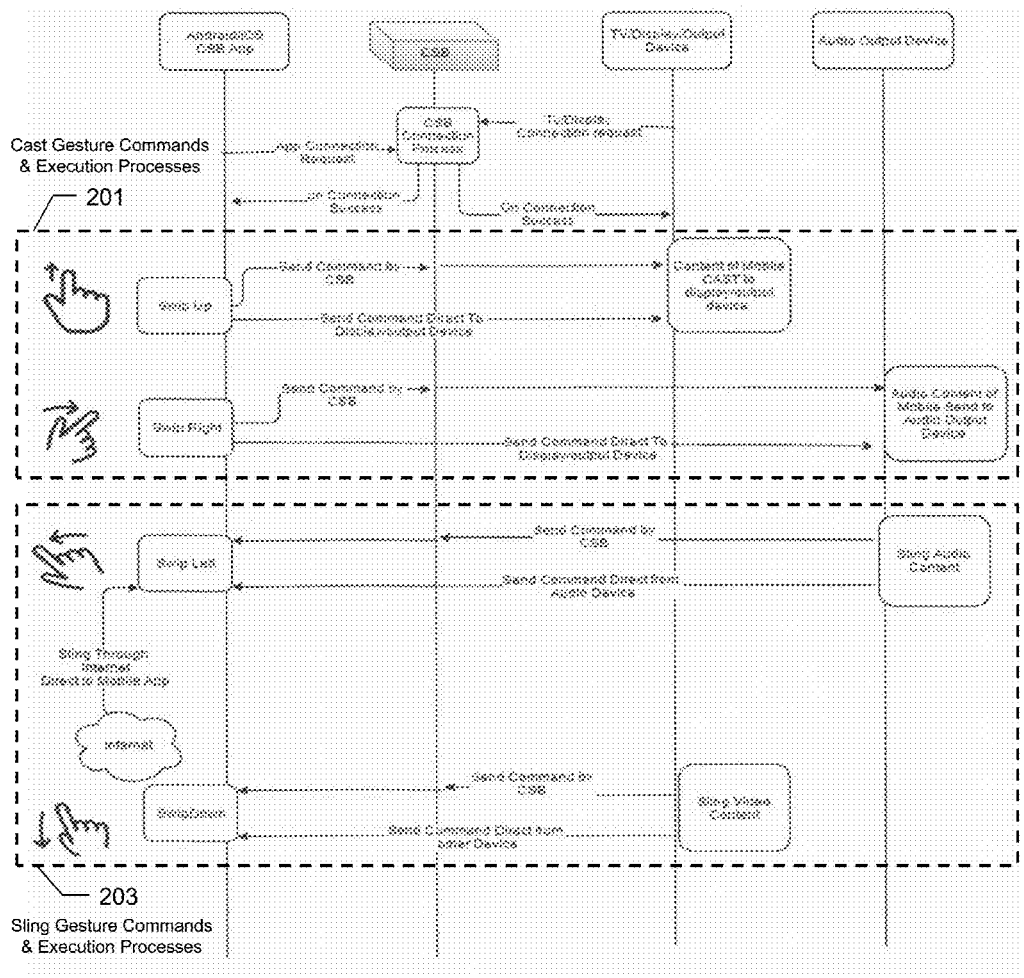
FIG. 2 shows a visual representation of sling and cast gesture commands and execution processes, in accordance with an embodiment of the invention.

FIG. 2 shows a visual representation (200) of sling and cast gesture commands and execution processes, in accordance with an embodiment of the invention. In this particular embodiment, sling and cast gesture commands are executed on an Android or iOS touch-screen device, such as a smart phone or a tablet computer. In another embodiment, similar or identical sling and cast gesture commands can be executed on another type of touch-screen electronic device that utilizes Windows, Linux, or another operating system. As shown in the visual representation (200) of this embodiment, a finger swipe-up gesture and a finger swipe-right gesture are two types of "cast" commands.

In a preferred embodiment of the invention, a user command to initiate "casting" of an audio/video (AV), graphical, or photographic multimedia content from the touch-screen electronic device to a targeted device (e.g. a television, another portable electronic display device, a cast-sling box, etc.) is a finger swipe-up gesture command. The swipe-up gesture may be particularly intuitive for a "casting" command that initiates multimedia content transmission because a finger swipe-up motion mimics a physical motion of pushing, throwing, or sending an item from the touch-screen electronic device to the targeted device. In particular, the user may feel that the finger swipe-up gesture for multimedia casting initiation is akin to "throwing" the content towards a targeted device (e.g. towards a television in the same room, a nearby portable electronic device with a display panel, a cast-sling box which further executes casting to an end destination device, etc.).

Furthermore, in the preferred embodiment of the invention, a user command to initiate "casting" of an audio content to wireless speakers (e.g. Bluetooth-enabled speakers) or to a wirelessly-networked audio system (e.g. Sonos devices on SonosNet) from the touch-screen electronic device is a finger swipe-right gesture command In an alternate embodiment of the invention, this user command may be performed by a finger swipe-left gesture command or another directional swipe command (e.g. a diagonal swipe, a circular swipe, or a finger swiping motion of another shape) instead. In some embodiments, extra user input variables, such as magnitudes of speed and/or pressure during a finger swipe, can also be utilized to define and determine a casting gesture command Defining a cast-initiating command with extra user input variables may be particularly useful, if simple directional swipe commands are already universally utilized for other purposes at the operating system level. Furthermore, for some embodiments of the invention, transparent user interfaces may be utilized to accommodate finger-move gestures between contents, which may also create an effect of a disintegrating breadcrumb trail.

In some embodiments of the invention, gyroscopic accelerometer sensing may be utilized to initiate a casting command. For example, a "throwing" motion or forward motion from a cast command-initiating device towards a targeted device can be quantified with a gyroscopic accelerometer integrated in the cast command-initiating device to determine a "cast vector." In such embodiments, the cast vector defines the direction and the magnitude of the user's accelerative motion that can be measured and analyzed to initiate a cast command to the targeted device. In some embodiments of the invention, pressure sensing may provide an additional dimension of user control for sling and cast commands by interpreting various pressure levels of the user input. For example, a user may define opacity (i.e. transparency or translucency levels) of a viewing window by changing finger pressures on the user interface during multimedia content casting to a target device. In this example, a stronger finger pressure may turn the viewing window more opaque, while a lighter finger pressure may transition the viewing window to be more transparent.

Moreover, in some embodiments of the invention, "air gestures," or non-physical-contact-based user gestures that are typically sensed and detected by visual and/or ultrasonic sensors, may also be supported by a cast command-initiating device to measure, determine, and initiate a casting command A preferred air gesture in one embodiment of the invention may be a "throwing" motion or a "push" motion near the cast command-initiating device towards a cast-targeted device. Yet in some embodiments of the invention, voice commands may be utilized to initiate a casting command A clear voice command, such as " . . . Cast Content A to Target Device B . . . ," may be issued by a user, which can be interpreted by the cast command-initiating device and converted into electrical signals for a specific cast command to a targeted device.

The "cast" commands may be transmitted directly to a targeted device (e.g. "TV/Display/Output Device" or "Audio Output Device" elements in FIG. 2), or indirectly to the targeted device via an intermediary unit, such as a cast-sling box (CSB), as shown in FIG. 2. In case of user-triggered cast commands and execution processes (201) for the embodiment as shown in FIG. 2, a user's gesture command (e.g. a finger swipe-up, a finger swipe-right, a gyro accelerometer-sensed gesture for a cast command vector, etc.) is first interpreted by a multimedia casting and slinging command user interface application, which is executed on the Android or iOS touch-screen device. Then, the multimedia casting and slinging command user interface application determines and correlates the user's gesture command to a particular type of a cast initiation command (e.g. an AV or computer graphics visual multimedia cast initiation command that corresponds to the finger swipe-up, or an audio cast initiation command that corresponds to the finger swipe-right). Subsequently, a corresponding electronic signal to initiate the particular type of multimedia casting is transmitted to the targeted device either directly to the targeted device, or indirectly to the targeted device via an intermediary set-top box, such as the CSB.

The targeted device may incorporate an authorization and permissions control to allow or prevent multimedia casting on the targeted device, wherein the multimedia casting involves display, playback, or recording of a multimedia content transmitted from the Android or iOS touch-screen device. In addition, in some embodiments of the invention, administrative rights may supersede or override user controls or user priorities.

Furthermore, in the embodiment of the invention as shown in FIG. 2, the targeted device (e.g. a television, a peer portable device, another multimedia output device) is typically selected by the user before the user issues a cast-initiating gesture command. Alternatively, a targeted device may be automatically selected or determined by the multimedia casting and slinging command user interface application, or by the cast-sling box based on device proximity, user casting target preferences settings, or another casting target-determining algorithms.

In the preferred embodiment of the invention, the multimedia casting and slinging command user interface application executed on the touch-screen electronic device also provides gesture-based commands to initiate "slinging" (i.e. requesting, receiving, playing, and/or storing) of multimedia contents from a targeted device. A user command to initiate "slinging" of an audio/video (AV), graphical, or photographic multimedia content from the targeted device (e.g. a television, another portable electronic display device, a cast-sling box, etc.) is a finger swipe-down gesture command. The swipe-down gesture may be particularly intuitive for a "slinging" command that initiates multimedia content transfer-in request and reception from the targeted device to the touch-screen electronic device because a finger swipe-down motion mimics a physical motion of "pulling-in" or receiving an item into the touch-screen electronic device. In particular, the user may feel that the finger swipe-down gesture for multimedia slinging initiation is akin to "bringing" the content towards the user from a targeted device.

Moreover, in the preferred embodiment of the invention, a user command to initiate "slinging" (i.e. requesting, receiving, playing, and/or storing) of an audio content from a targeted device to the touch-screen electronic device is a finger swipe-left gesture command. The targeted device may be a peer-to-peer device configured to transmit the audio content directly to the touch-screen electronic device upon request from a user, who initiates the audio content sling procedure via the finger swipe-left gesture command. Alternatively, the targeted device may be a networked device (e.g. a computer server executing an audio library, a Sonos-receiving node, another wirelessly-networked device, etc.) capable of transmitting the audio content to the touch-screen electronic device via a wireless network, if the user makes the audio content sling request with the finger swipe-left gesture command In one embodiment of the invention, multimedia contents accessible by the Sonos-receiving node can also be "slinged" to a CSB-connected device, such as a mobile device, a tablet computer, or a wireless speaker connected to the CSB. Typically, the Sonos-receiving node is configured to access an audio library portal to retrieve and playback a variety of audio contents on Sonos-connected devices and wireless speakers. By connecting the Sonos-receiving node to the CSB, a registered device connected to the CSB is also able to interact with a Sonos control user interface and access (e.g. sling) various audio contents that are retrievable from the Sonos-receiving node.

Furthermore, in an alternate embodiment of the invention, this user command may be performed by a finger swipe-right gesture or another directional swipe command (e.g. a diagonal swipe, a circular swipe, or a finger swiping motion of another shape) instead. In some embodiments, extra user input variables, such as magnitudes of speed and/or pressure during a finger swipe, can also be utilized to define and determine a slinging gesture command Defining a sling-initiating command with extra user input variables may be particularly useful, if simple directional swipe commands are already universally utilized for other purposes at the operating system level. Furthermore, for some embodiments of the invention, transparent user interfaces may be utilized to accommodate finger-move gestures between contents, which may also create an effect of a disintegrating breadcrumb trail.

In some embodiments of the invention, gyroscopic accelerometer sensing may be utilized to initiate a slinging command. For example, a "pulling-in" motion from a targeted device towards a sling content-receiving device can be quantified with a gyroscopic accelerometer integrated in a sling command-initiating device to determine a "sling vector." In such embodiments, the sling vector defines the direction and the magnitude of the user's accelerative motion that can be measured and analyzed to initiate a sling command to the targeted device.

Moreover, in some embodiments of the invention, "air gestures," or non-physical-contact-based user gestures that are typically sensed and detected by visual and/or ultrasonic sensors, may also be supported by a sling command-initiating device to measure, determine, and initiate a slinging command A preferred air gesture in one embodiment of the invention may be a "pulling-in" motion from a sling-targeted device towards a sling content-receiving device, which can be the sling command-initiating device or another device. Yet in some embodiments of the invention, voice commands may be utilized to initiate a slinging command A clear voice command, such as " . . . Sling Content C from Target Device D to Device E . . . ," may be issued by a user, which can be interpreted by the sling command-initiating device and converted into electrical signals for a specific sling command to a targeted device. In some embodiments of the invention, pressure sensing may provide an additional dimension of user control for sling and cast commands by interpreting various pressure levels of the user input. For example, a user may define opacity (i.e. transparency or translucency levels) of a viewing window by changing finger pressures on the user interface during multimedia content casting to a target device. In this example, a stronger finger pressure may turn the viewing window more opaque, while a lighter finger pressure may transition the viewing window to be more transparent.

The preferred embodiment of the invention, as described above and as shown in FIG. 2, does not limit the scope of other embodiments of the invention, which may utilize different finger swipe patterns, arrangements, or other user gestures for correlating casting and slinging initiations with gesture-based user commands executed on the touch-screen electronic device. Furthermore, the touch-screen electronic device may be a portable electronic device (e.g. a smart phone, a tablet computer, a notebook computer, a portable gaming device, etc.), a wearable electronic device with an embedded display unit, or a display unit connected to a television, a computer server, a kiosk, or another less portable electronic system, which may be utilized in a connected home or office environment.

Continuing with the embodiment of the invention as shown in FIG. 2, in case of user-triggered sling commands and execution processes (203), a user's gesture command (e.g. a finger swipe-down, a finger swipe-left, etc.) is first interpreted by a multimedia casting and slinging command user interface application, which is executed on the Android or iOS touch-screen device. Then, the multimedia casting and slinging command user interface application determines and correlates the user's gesture command to a particular type of a sling initiation command (e.g. an AV or computer graphics visual multimedia sling initiation command that corresponds to the finger swipe-down, or an audio sling initiation command that corresponds to the finger swipe-left). Subsequently, a corresponding electronic signal to initiate the particular type of multimedia slinging is transmitted to the targeted device either directly to the targeted device, or indirectly to the targeted device via an intermediary set-top box, such as the CSB.

The targeted device may incorporate an authorization and permissions control to allow or prevent multimedia slinging from the targeted device to the Android or iOS touch-screen device, wherein the multimedia slinging involves receiving a multimedia content sling request from the Android or iOS touch-screen device, allowing or denying the multimedia content sling request, and transmission of a requested multimedia content to the Android or iOS touch-screen device. In addition, in some embodiments of the invention, administrative rights may supersede or override user controls or user priorities.

Furthermore, in the embodiment of the invention as shown in FIG. 2, the targeted device (e.g. a television, a peer portable device, another multimedia output device) and a particular multimedia content for slinging are typically selected by the user before the user issues a sling-initiating gesture command. Alternatively, a targeted device and/or a particular multimedia content for slinging may be automatically selected or determined by the multimedia casting and slinging command user interface application, or by the cast-sling box based on device proximity, user slinging target preferences settings, or another slinging target-determining algorithms (e.g. QoS, network type selection, DVR, on-screen, cast-to-sling, etc.).

Moreover, in some embodiments of the invention, network selection for transmission of multimedia contents after execution of casting or slinging commands may be intelligently determined based on at least one of inter-device proximity, network speed, power state or preferences, and QoS rules associated with transmitting and receiving devices. For example, an intelligent network selection algorithm executed by a CSB may select the highest-throughput and uncompressed communication protocol between a multimedia content-transmitting device and a multimedia content-receiving device, if the two devices are within line of sight (LoS). If the two devices are further apart and are not in line of sight, then the intelligent network selection algorithm may choose the next-best protocol that provides a relatively high data throughput under the current inter-device proximity. Similarly, the intelligent network selection algorithm may choose the highest possible network speed for accommodating casting or slinging of multimedia contents between the multimedia content-transmitting device and the multimedia content-receiving device.

Furthermore, in some instances, the intelligent network selection algorithm may select a communication protocol that provides best energy efficiency for inter-device communications among a plurality of available protocols. For example, if energy efficiency is configured as the user's important preference in the CSB, the intelligent network selection algorithm executed in the CSB may choose Bluetooth (IEEE 802.15 standard) for a particular cast operation instead of WiFi (IEEE 802.11 standard) or LTE (cellular network 4G), because Bluetooth may provide a higher energy efficiency than those offered by other available protocols. Moreover, the intelligent network selection algorithm may also incorporate one or more specific quality-of-service (QoS) rules associated with data-transmitting and data-receiving devices for cast and sling operations. In such instances, the QoS rules can take precedence over other available network selection methods. Furthermore, in some embodiments of the invention, IoT devices and other electronic devices connected to the CSB can be seamlessly and automatically activated or deactivated by a sling or cast command-issuing device via the CSB's intermediary commands that can turn on or turn off the CSB-connected devices, depending on desirable states of each CSB-connected device for a particular user command or a current user device proximity to the CSB, IoT devices, and other electronic devices. For example, a user holding a command-issuing device and walking into a room equipped with a CSB connected to a plurality of electronic devices may trigger the CSB to activate a smart television and a plurality of IoT light bulbs in the room, if the user issues a command to turn on the IoT light bulbs via the CSB and also instructs the CSB to display the real-time power consumption of the IoT light bulbs on the smart television. Then, if the user walks out of the room, the CSB may automatically deactivate the plurality of IoT light bulbs and the smart TV to conserve energy.

Figure 3:
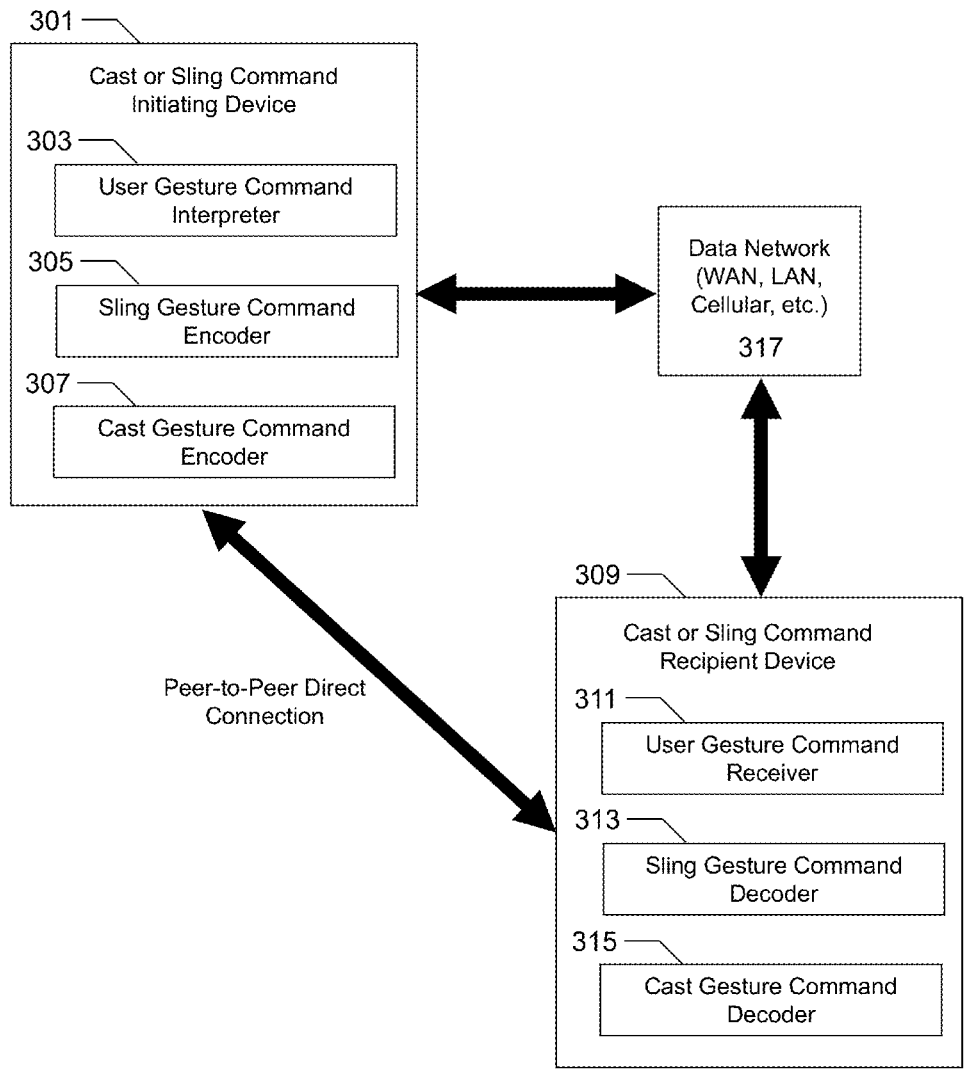
FIG. 3 shows an example of cast/sling command processing modules in a command-initiating device and a command-receiving device, in accordance with an embodiment of the invention.

FIG. 3 shows an example (300) of cast/sling command processing modules in a command-initiating device and a command-receiving device, in accordance with an embodiment of the invention. In this example (300), a cast or sling command-initiating device (301) includes a user gesture command interpreter (303), a sling gesture command encoder (305), and a cast gesture command encoder (307). The cast or sling command-initiating device (301) may be a smart phone, a tablet computer, a wearable electronic device, a special-purpose cast-sling box remote controller with a touch screen, or another electronic device equipped with a touch screen display unit.

The cast or sling command-initiating device (301) incorporates a memory unit, a central processing unit (CPU), and/or an application processor unit (APU), which are configured to control or execute the user gesture command interpreter (303), the sling gesture command encoder (305), and the cast gesture command encoder (307). In a preferred embodiment of the invention, the user gesture command interpreter (303), the sling gesture command encoder (305), and the cast gesture command encoder (307) are part of a mobile application configured to work in an Android or iOS environment, or a desktop/notebook computer application configured to work in a Windows or Mac OS X environment. The multimedia casting and slinging command user interface application described in conjunction with FIG. 1 and FIG. 2 can be the mobile application or the desktop/notebook computer application that contain the user gesture command interpreter (303), the sling gesture command encoder (305), and the cast gesture command encoder (307).

In another embodiment, the user gesture command interpreter (303), the sling gesture command encoder (305), and the cast gesture command encoder (307) may be at least partially implemented in a semiconductor chip as an application-specific integrated circuit, a field-programmable gate array (FPGA), a graphical processing unit (GPU), a central processing unit (CPU), or another hardware logic component.

In the preferred embodiment of the invention, the user gesture command interpreter (303) incorporated in the cast or sling command-initiating device is configured to analyze a user's swiping gesture pattern, speed, and/or pressure on a touch screen. If the user's swiping motion matches a profile of a particular cast or sling command, then the user gesture command interpreter (303) instructs either the sling gesture command encoder (305) or the cast gesture command encoder (307) to generate a corresponding electronic signal and/or a data packet, which is subsequently transmitted to a cast or sling command-recipient device (309) via a P2P direct connection or via a data network (317), as shown in FIG. 3.

Continuing with the example (300) shown in FIG. 3, the cast or sling command-recipient device (309) may be a portable electronic device, a television, an audio system, an intermediary unit (e.g. a cast-sling box) configured to provide seamless interoperability among a plurality of cast or sling command-capable devices, or another multimedia-playable electronic device directly or indirectly connected to the cast or sling command-initiating device (301). In this embodiment of the invention, the cast or sling command-recipient device (309) includes a user gesture command receiver (311), a sling gesture command decoder (313), and a cast gesture command decoder (315).

The cast or sling command-recipient device (309) incorporates a memory unit, a central processing unit (CPU), and/or an application processor unit (APU), which are configured to control or execute the user gesture command receiver (311), the sling gesture command decoder (313), and the cast gesture command decoder (315). In a preferred embodiment of the invention, the user gesture command receiver (311), the sling gesture command decoder (313), and the cast gesture command decoder (315) are part of a mobile application configured to work in an Android or iOS environment, or a desktop/notebook computer application configured to work in a Windows or Mac OS X environment. The multimedia casting and slinging command user interface application described in conjunction with FIG. 1 and FIG. 2 can be the mobile application or the desktop/notebook computer application that contain the user gesture command receiver (311), the sling gesture command decoder (313), and the cast gesture command decoder (315). In another embodiment, the user gesture command receiver (311), the sling gesture command decoder (313), and the cast gesture command decoder (315) may be at least partially implemented in a semiconductor chip as an application-specific integrated circuit, a field-programmable gate array (FPGA), a graphical processing unit (GPU), an application processing unit (APU), a central processing unit (CPU), or another hardware logic component.

In the preferred embodiment of the invention, the user gesture command receiver (311) incorporated in the cast or sling command-recipient device is configured to receive an electronic signal and/or a data packet containing an encoded sling command or an encoded cast command from the cast or sling command-initiating device (301). The user gesture command receiver (311) is also configured to identify, categorize, and authenticate the electronic signal and/or the data packet as the encoded sling command or the encoded cast command. If the electronic signal and/or the data packet are identified as the encoded sling command, then the electronic signal and/or the data packet are sent to the sling gesture command decoder (313), which decodes and further identifies a specific type of sling command (e.g. requesting transmission of a visual multimedia content or an audio content from the sling command-recipient device, etc.).

On the other hand, if the electronic signal and/or the data packet are identified as the encoded cast command, then the electronic signal and/or the data packet are sent to the cast gesture command decoder (315), which decodes and further identifies a specific type of cast command (e.g. requesting receipt and processing of a visual multimedia content or an audio content streaming from the cast command-initiating device, etc.).

In some embodiments of the invention, the sling gesture command decoder (313) and the cast gesture command decoder (315) may not need to exist as separate logical units for processing cast or sling commands originating from the command-initiating device, if the incoming electronic signal and/or the data packet already contain native device-level commands that the command-recipient device can readily understand and decipher without dedicated gesture command decoders. Furthermore, in some embodiments of the invention, cast or sling commands may be interpreted, transcoded, and/or decoded by an intermediary unit (e.g. a CSB) before any cast or sling-related commands reach a final destination device for receiving and responding to such commands.

Figure 4:
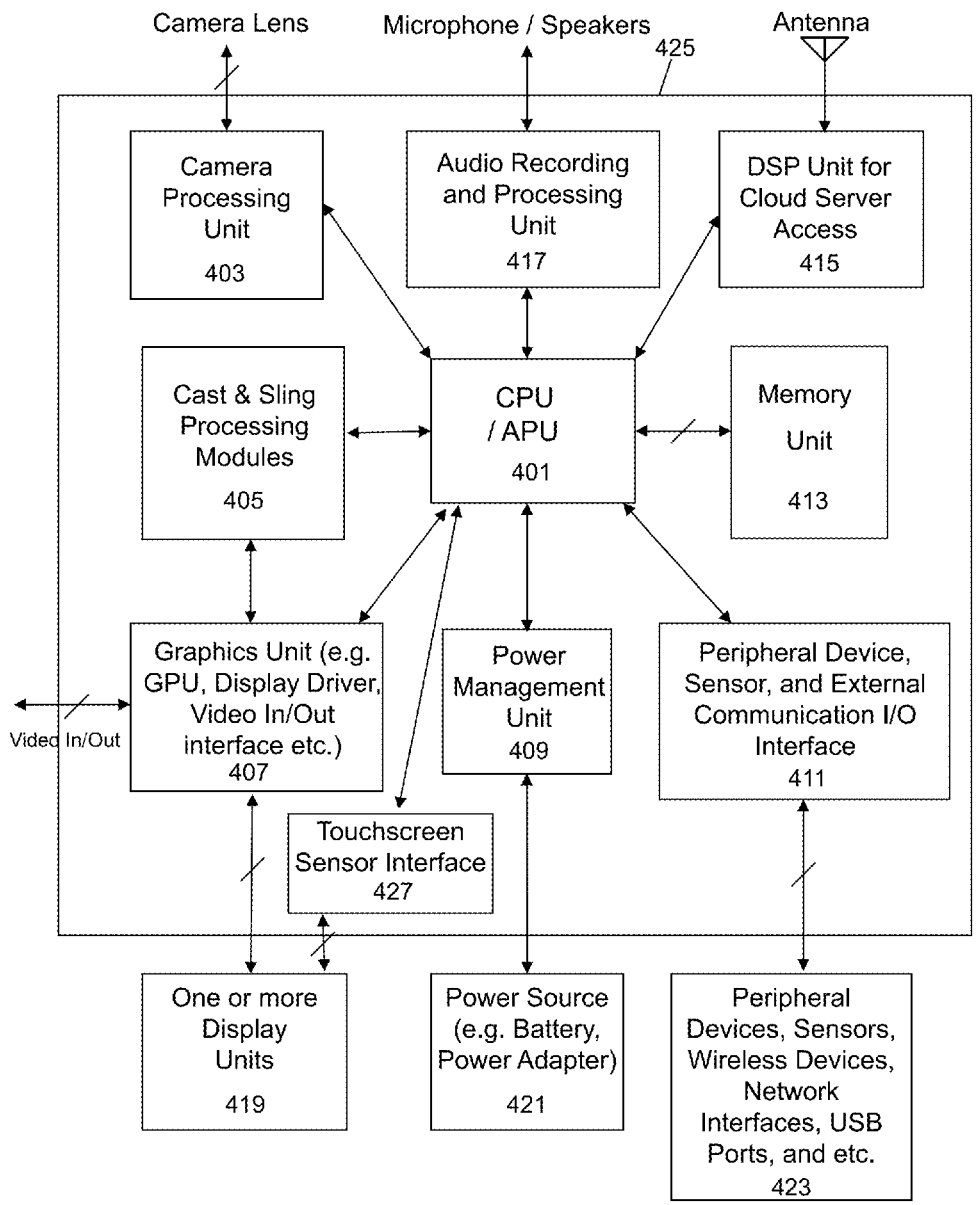
FIG. 4 shows a hardware block diagram example of a cast/sling command-initiating or cast/sling command-receiving device, in accordance with an embodiment of the invention.

FIG. 4 shows a hardware block diagram example (400) of an electronic system representing a cast/sling command-initiating or cast/sling command-receiving device, in accordance with an embodiment of the invention. The cast/sling command-initiating or command-receiving device may be a portable electronic device, a wearable electronic device, a computer display panel, a kiosk, a television, another electronic device with a touch-sensitive display panel, or a cast-sling box (CSB). In a preferred embodiment of the invention, the cast/sling command-initiating or command-receiving device contains one or more cast and sling processing modules, which have been described, for example, as various modules (i.e. elements 303, 305, 307, 311, 313, 315) in association with FIG. 3.

In a preferred embodiment of the invention, the block diagram of the cast/sling command-initiating or cast/sling command-receiving device incorporates a central processing unit (CPU) (401) or an application processor unit (APU), which is operatively connected to a memory and/or data storage unit (413), cast and sling processing modules (405), a camera processing unit (403) connected to a camera lens, a graphics unit (407) (e.g. a graphics processor, a display driver, and etc.), a power management unit (409), a peripheral device and/or external communication I/O interface (411), a digital signal processing (DSP) unit for cloud server access (415), and an audio recording and processing unit (417), which is operatively connected to a microphone and one or more speakers. These logical units may be placed on a single printed circuit board (425) in one embodiment of the invention, or on a plurality of printed circuit boards in another embodiment of the invention.

In the preferred embodiment of the invention, the CPU/APU (401) is configured to control each logical unit operatively (i.e. directly or indirectly) connected to the CPU/APU (401). The memory and/or data storage unit (413) typically comprises volatile memory banks based on DRAM's. In some embodiments of the invention, the memory and/or data storage unit (413) may use non-volatile memory technologies such as SRAM's and/or Flash memory. The memory and/or data storage unit (413) is capable of storing programs, applications, and/or multimedia files that can be executed by the CPU/APU (401), the graphics unit (407), or another logical unit operatively connected to the memory and/or data storage unit (413). Furthermore, in the preferred embodiment of the invention, cast and sling processing modules (405) executed on the CPU/APU (401) and the memory and/or data storage unit (413) of the electronic system provide various cast/sling user gesture command interpretations, command encodings and decodings, multimedia data transmission and receipt management, multimedia data recording, and multimedia data playback functionalities.

Moreover, in the preferred embodiment of the invention, the electronic system representing the cast/sling command-initiating or cast/sling command-receiving device is capable of performing data encryption, decryption, graphical rendering, and various multimedia format conversions and processing by utilizing the CPU/APU (401), the graphics unit (407), and/or another logical unit operatively connected to the memory and/or data storage unit (413).

In addition, in the preferred embodiment of the invention, a touchscreen sensor interface (427) may be connected to the CPU/APU (401) and one or more display units (419), which may embed capacitive or other types of touch sensors to detect user touch inputs and gestures. The touchscreen sensor interface (427) is configured to read and interpret touch sensor values transmitted from the one or more display units (419). In some embodiments of the invention, pressure sensing may provide an additional dimension of user control for sling and cast commands by interpreting various pressure levels of the user input. For example, a user may define opacity (i.e. transparency or translucency levels) of a viewing window by changing finger pressures on the user interface during multimedia content casting to a target device. In this example, a stronger finger pressure may turn the viewing window more opaque, while a lighter finger pressure may transition the viewing window to be more transparent. Furthermore, in some embodiments, an air gesture sensor may also be connected to the peripheral device, sensor, and/or external communication I/O interface (411) to support air gestures for cast or sling user commands. Moreover, the electronic system as illustrated in FIG. 4 may also provide data encryption, decryption, compression, decompression, and conversion based on security and QoS requirements of incoming or outgoing multimedia contents.

Continuing with the embodiment of the invention as shown in FIG. 4, any software and programs executed on the CPU/APU (401) and the memory and/or data storage unit (413) of the electronic system may be part of an operating system, or a separate application installed on the operating system of the electronic system. Furthermore, in this particular embodiment, the camera processing unit (403) is operatively connected to a camera lens on the electronic system, and is able to process real-time image-related data from the camera lens via the CPU/APU (401) and/or other logical units in the electronic system to provide a camera lens-captured multimedia video feed that can be utilized in a cast or sling process executed by the cast/sling command-initiating and cast/sling command receiving device. Moreover, the microphone operatively connected to the audio recording and processing unit (417) can produce live recorded audio content, which can also be utilized in a cast or sling process executed by the cast/sling command-initiating and cast/sling command receiving device.

Furthermore, as shown in FIG. 4, the digital signal processing (DSP) unit for cloud server access (415) is operatively connected to an radio frequency (RF) antenna. The DSP unit for cloud server access (415) is generally configured to receive and transmit multimedia data and/or voice signals wirelessly for a mobile communication device, a wireless audio system, a smart television, an electronic goggle, or another suitable electronic system. In addition, the electronic system representing the cast/sling command-initiating or cast/sling command-receiving device is also configured to communicate via a physical wired connection, such as an Ethernet cable or a fiber optic cable.

In addition, the power management unit (409) is operatively connected to a power supply unit and a power source (e.g. battery, power adapter) (421), and the power management unit (409) generally controls power supplied to the electronic system (i.e. the cast/sling command-initiating or cast/sling command-receiving device). Moreover, the peripheral device and/or external communication I/O interface (411) as shown in FIG. 4 can be operatively connected to one or more peripheral devices, wireless devices (e.g. WiLAN, Bluetooth, SonosNet, etc.), USB ports, USB-enabled devices, and other external data communication media (423).

Continuing with the embodiment of the invention shown in FIG. 4, the graphics unit (407) in the system block diagram (400) for the electronic system comprises a graphics processor, a display driver, a dedicated graphics memory and/or data storage unit, and/or another graphics-related logical components. In general, the graphics unit (407) is able to process and communicate graphics-related data with the CPU/APU (401), the display driver, and/or the dedicated graphics memory and/or data storage unit. The graphics unit (407) is also operatively connected to one or more display units (419), and is operatively connected to video in/out ports, an HDMI interface, and/or another multimedia port. In addition, the CPU/APU (401) is operatively connected to the audio recording and processing unit (417) for generation of audio sound via wired or wireless speakers, wherein the audio sound may be at least partially "slinged" from a targeted device after a sling command is executed for the electronic system. Moreover, the CPU/APU (401) operatively connected to the audio recording and processing unit (417) is configured to manage and control recording of aural information from the microphone operatively connected to the electronic system, which can subsequently be "casted" to a targeted device for a localized audio content replay from the targeted device (e.g. a television speaker, a wireless audio speaker on a SonosNet, a peer-connected smart phone, etc.) after a cast command is fully executed.

Figure 5:
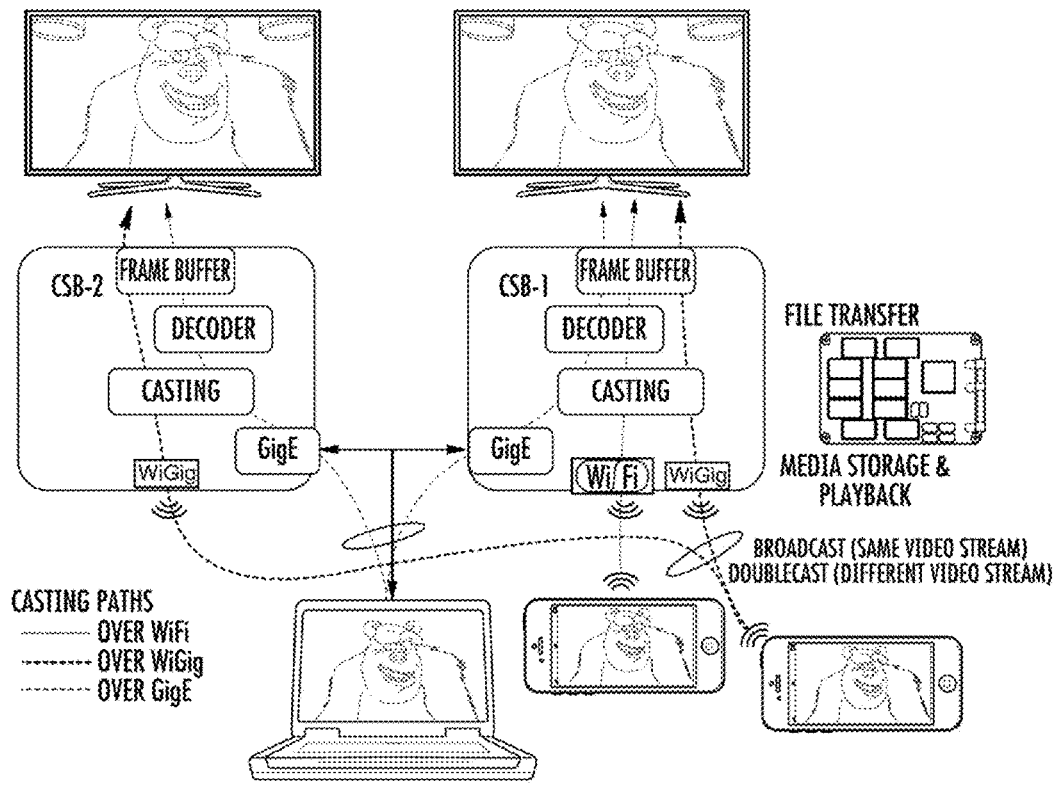
FIG. 5 shows "cast" command pathways in an interoperable multiple display device environment with novel cast-sling boxes (CSB's), in accordance with an embodiment of the invention.

FIG. 5 shows "cast" command pathways (500) in an interoperable multiple display device environment with novel cast-sling boxes (CSB's), in accordance with an embodiment of the invention. Preferably, each cast command is initiated with a user's swipe-up or swipe-right gesture command on a cast command-initiating device, as previously described in the Specification. One potential cast command pathway is from a cast command-initiating device (e.g. a portable electronic device such as a notebook computer, a smart phone, a tablet computer device, a portable gaming device, an electronic goggle, etc.) to a first cast-sling box (CSB-1) and/or to a second cast-sling box (CSB-2), which is further connected to one or more large display devices, as shown in FIG. 5. This potential cast command pathway can be implemented with a matching pair of WiFi, WiGig, GigE transceivers, other wireless protocols, and/or wireless network routers. Alternatively, the potential cast command pathway from the portable electronic device to either of the CSB's can also be supported by peer-to-peer direct communication protocols, such as Bluetooth and HDMI standards. This potential cast command pathway may be wireless, physical-cable connected, or a combination of both wired and wireless configurations.

In this embodiment, an end destination device (i.e. also described herein as a "targeted device,") is a large display device intermediated by CSB-1 and/or CSB-2 for seamless interoperability in casting command executions between the portable electronic device and the large display device. In other embodiments of the invention, one or more targeted devices may be other electronic devices that incorporate display units. Furthermore, the presence of CSB's in executing multimedia cast commands may not be necessary in some embodiments, if devices are able to establish direct multimedia content transfer compatibility for casting and slinging activities.

Moreover, in the embodiment of the invention as shown in FIG. 5, the portable electronic device may be configured to "broadcast" or "double-cast" to one or more CSB's. In a "broadcasting" application of a multimedia data stream from the portable device to CSB's, a single multimedia content originating from the portable electronic device is "casted" to designated CSB's, thus resulting in a playback or recording of the same single multimedia content at each of the targeted device (e.g. one or more large display panels connected to the designated CSB's.). Alternatively, the portable device may also be configured to "double-cast," or selectively transfer two or more distinct multimedia contents simultaneously to one or more CSB's. Preferably, each CSB is capable of processing "double-casted" multimedia contents and displaying one or both of the casted contents simultaneously on the large display panels, as shown in FIG. 5.

Furthermore, as shown in the embodiment of the invention of FIG. 5, each CSB, if connected between the targeted device and the portable electronic device, is capable of receiving, decoding, accepting, or denying cast commands, decoding an incoming "casted" multimedia content from the portable device, and selectively transcoding the incoming "casted" multimedia content to provide seamless compatibility to the targeted device, if the CSB determines that transcoding enhances compatibility with the targeted device. Furthermore, the CSB is also capable of buffering the decoded or transcoded multimedia frames in a memory unit and transmitting the decoded or transcoded multimedia content to the targeted device (e.g. a large display panel connected to a CSB) to accommodate the user's cast command from the portable device.

In some embodiments of the invention, one or more CSB's (e.g. CSB-1, CSB-2, etc.) can be "cascaded" to execute one or more levels of cast-to-sling or sling-to-cast operations. For example, a first user device may initiate a cast command to CSB-1 or to a large display screen connected to CSB-1. As the casted multimedia content is recorded and/or played back via CSB-1 on the large display screen, a second user device may request slinging of the same multimedia content from the large display screen via CSB-2. In this particular example, the sling request from the second user device may be fulfilled by CSB-2 subsequently sending and establishing a sling connection with CSB-1 that has been casting to the large display device. Therefore, a single level of cast-to-sling operation has been established in this example. Furthermore, the cast-to-sling or sling-to-cast operation can also be achieved with just a single CSB in some embodiments, if multiple user devices connected to the single CSB are making various cast or sling requests for the same multimedia content processed by the single CSB. Moreover, multiple levels or depths of cast-to-sling or sling-to-cast operations are also achievable in some embodiments of the invention, if one or more CSB's are connected to a plurality of user devices to relay and process multimedia contents in a cascaded manner (e.g. "cast-to-sling-to-cast-to-sling . . . ," "sling-to-cast-to-sling-to-cast . . . ," etc.). In some embodiments, casted contents displayed in a plurality of windows of a user interface can be individually slinged to another device via the user interface.

In an alternate embodiment of the invention, the portable device and the targeted device may be able to accommodate multimedia casting between the two devices directly without intermediary execution processes and/or transcoding provided by a CSB. In such situations, direct casting without CSB intermediations may require installation of an embedded cast/sling command analysis and decoding module on the targeted device that correlates and complements the multimedia cast/sling command user interface and encoding modules executed on the portable electronic device, or on another cast command-initiating device.

Figure 6:
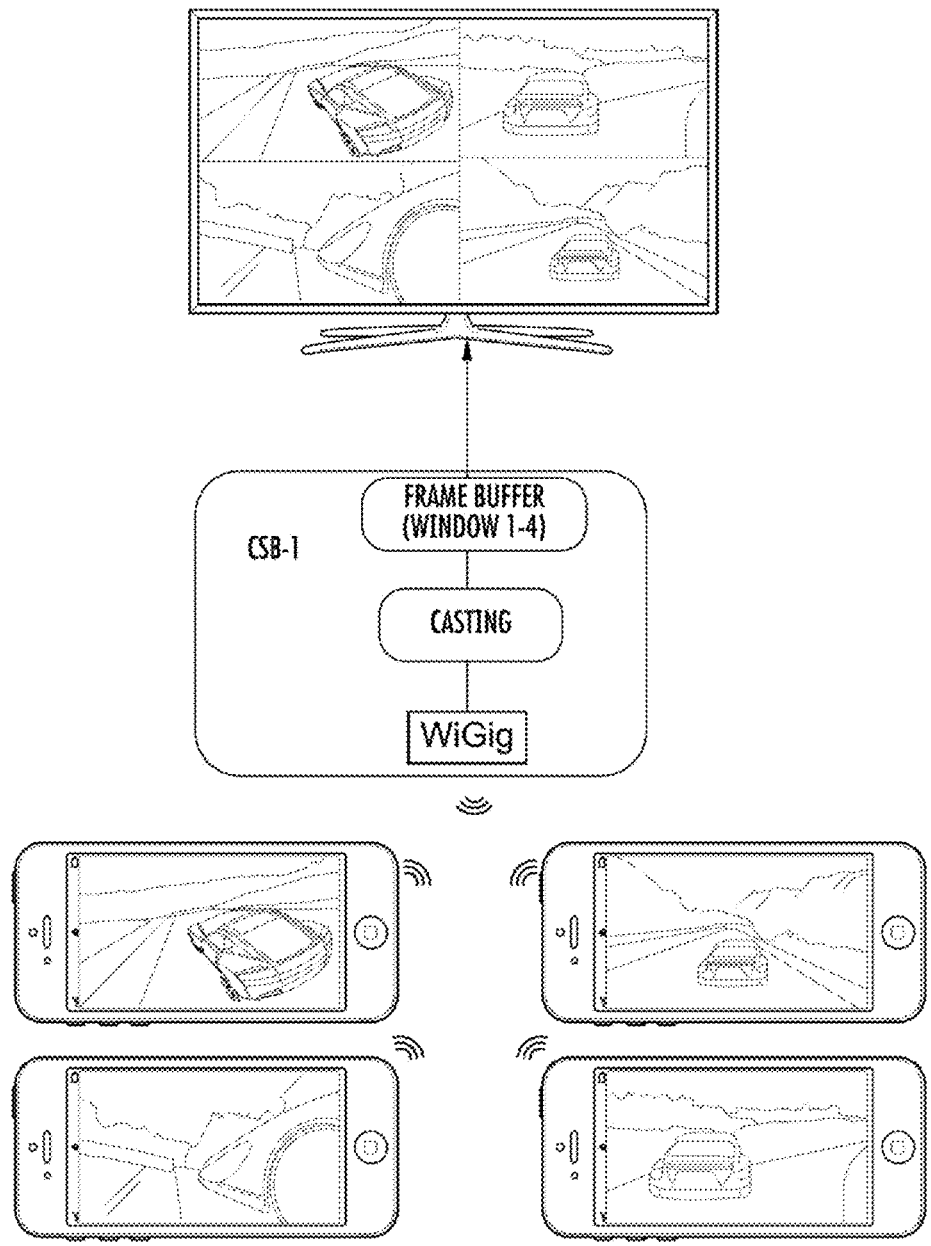
FIG. 6 shows multiple "cast" commands by a plurality of cast-initiating devices to a large display panel via a novel cast-sling box (CSB-1), in accordance with an embodiment of the invention.

FIG. 6 shows multiple "cast" commands by a plurality of cast-initiating devices to a large display panel via a novel cast-sling box (CSB-1) as a multi-cast command pathway (600), in accordance with an embodiment of the invention. The multi-cast command pathway (600) involves transmitting a multiple number of distinct multimedia contents from a plurality of cast command-initiating devices (e.g. portable electronic devices such as notebook computers, smart phones, tablet computer devices, portable gaming devices, electronic goggles, etc.) to a first cast-sling box (CSB-1), which is further connected to a large display device, as shown in FIG. 6. This cast command pathway can be implemented with a matching pair of WiFi, WiGig, GigE transceivers, and/or other wireless network routers between each cast command-initiating device and the first cast-sling box. Alternatively, the cast command pathway for this multi-cast application can also be supported by peer-to-peer direct communication protocols, such as Bluetooth and HDMI standards. The multi-cast command pathway may be wireless, physical-cable connected, or a combination of both wired and wireless configurations.

In this embodiment, an end destination device (i.e. also described herein as a "targeted device,") is the large display device intermediated by CSB-1 for seamless interoperability in casting command executions between the cast command-initiating device and the large display device. In other embodiments of the invention, the targeted device may be another electronic device that incorporates a display unit. Furthermore, the presence of a CSB in executing multimedia cast commands may not be necessary in some embodiments, especially if devices are able to establish direct multimedia content transfer compatibility for casting and slinging activities.

Moreover, in the embodiment of the invention as shown in FIG. 6, each portable electronic device and the CSB-1 are configured to multi-cast to the targeted device (e.g. the large display device). The CSB-1 is capable of simultaneously decoding, transcoding, and/or processing four distinct multimedia contents and transmit each of the four decoded, transcoded, and/or processed multimedia contents to the large display device, which in turn displays the four distinct multimedia contents simultaneously on its display panel, as shown in FIG. 6. Depending on the user preferences command or device settings, the CSB-1 may selectively transmit one or more distinct multimedia contents to the large display device for playback, while recording one or more distinct multimedia contents in the CSB-1's non-volatile data storage, regardless of their playback status on the large display device when the multi-cast mode is activated.

As shown in the embodiment of the invention of FIG. 6, the CSB-1, if connected between the targeted device and each portable electronic device, is capable of receiving, decoding, accepting, or denying cast commands, decoding an incoming "casted" multimedia content from the portable device, and selectively transcoding the incoming "casted" multimedia content to provide seamless compatibility to the targeted device, if the CSB-1 determines that transcoding enhances compatibility with the targeted device. Furthermore, the CSB-1 is also capable of buffering the decoded or transcoded multimedia frames in a memory unit and transmitting the decoded or transcoded multimedia content to the targeted device to accommodate the user's cast command from the portable device.

In an alternate embodiment of the invention, the plurality of portable devices and the targeted device may be able to accommodate multimedia multi-casting among the connected devices directly without intermediary execution processes and/or transcoding provided by the CSB-1. In such situations, direct multi-casting without CSB intermediations may require installation of an embedded cast/sling command analysis and decoding module on the targeted device that correlates and complements the multimedia cast/sling command user interface and encoding modules executed on each portable electronic device, or on another cast command-initiating device.

Figure 7:
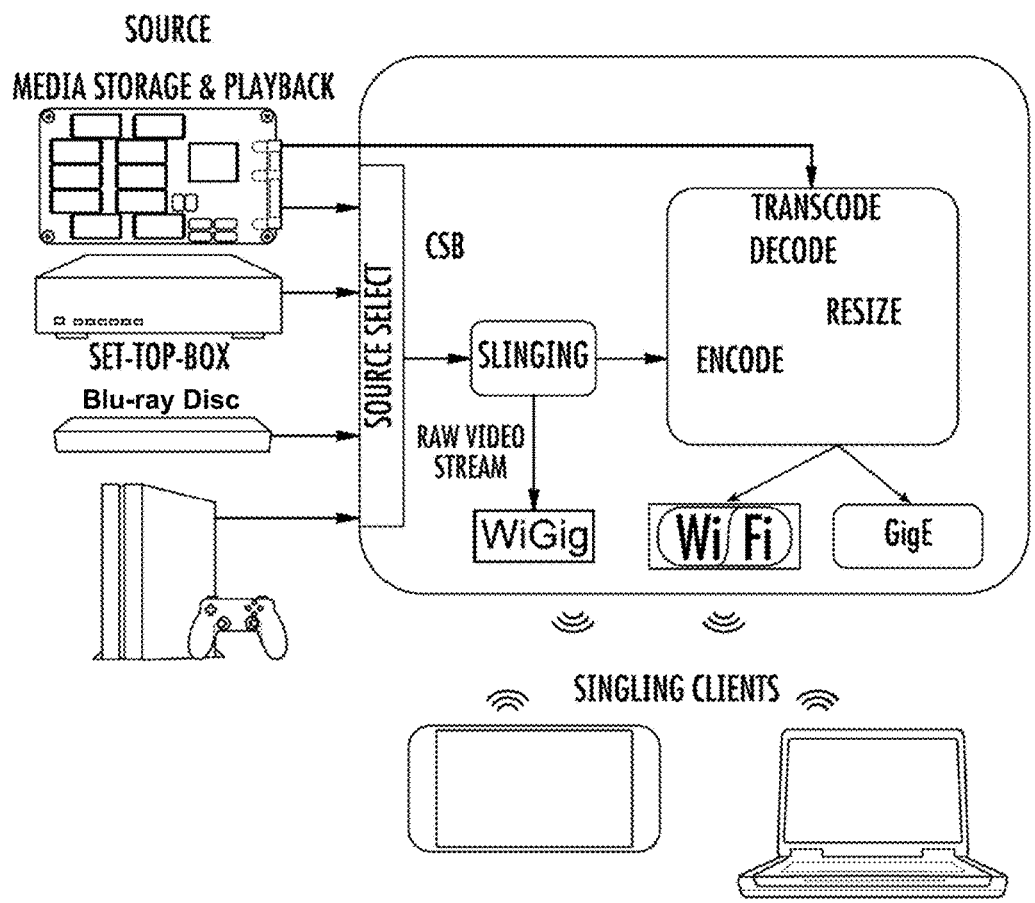
FIG. 7 shows "sling" command pathways in an interoperable multiple display device environment with a novel cast-sling box (CSB), in accordance with an embodiment of the invention.

FIG. 7 shows "sling" command pathways (700) in an interoperable multiple display device environment with a novel cast-sling box (CSB), in accordance with an embodiment of the invention. Preferably, each sling command is initiated with a user's swipe-down or swipe-left gesture command on a sling command-initiating device, as previously described in the Specification. A typical sling command pathway is started with a sling request from a sling command-initiating device (e.g. a portable electronic device such as a notebook computer, a smart phone, a tablet computer device, a portable gaming device, an electronic goggle, etc.) to the CSB, which further communicates with an end target device (e.g. a media storage and playback system, a television set-top box, an optical media disc player, a game console, etc.) that typically contains multimedia contents that can be selected by the user and slinged (i.e. transferred, transmitted, re-directed, etc.) to the sling command-initiating device for playback and/or localized storage.

This potential sling command pathway can be implemented with a matching pair of WiFi, WiGig, GigE transceivers, and/or wireless network routers. Alternatively, the potential sling command pathway can also be supported by peer-to-peer direct communication protocols, such as Bluetooth and HDMI standards. Furthermore, the potential sling command pathway shown in FIG. 7 may be wireless, physical-cable connected, or a combination of both wired and wireless configurations.

In this embodiment, an end target device for a sling command is a multimedia content storage or a content hub (e.g. a media storage and playback system, a television set-top box, an optical media disc player, a game console, etc.), which is intermediated by the CSB for seamless interoperability in slinging command executions between each sling command-initiating device and the end target device for slinging operations. In other embodiments of the invention, one or more targeted devices may be other electronic devices that incorporate display units. Furthermore, the presence of CSB's in executing multimedia sling commands may not be necessary in some embodiments, if devices are able to establish direct multimedia content transfer compatibility for casting and slinging activities.

In some embodiments of the invention, when a plurality of casted or slinged contents are transferred, processed, and displayed by one or more electronic devices, it becomes visually difficult for the user to track or intuitively recognize the origin of each casted or slinged content. The user may also be confused as to what is being casted and what is being slinged on a display panel. The confusion may be even more pronounced if a multiple number of users is concurrently engaged in casting and slinging of multimedia or IoT data to one or more display panels.

Therefore, in a preferred embodiment of the invention, when a casted or slinged content (e.g. video, graphics, photos, IoT data, etc.) is displayed on a display panel of an end-user device, a window frame that encapsulates the casted or slinged content in the end-user device can be dynamically color-coded to match the window frame color of the content source device. If a CSB is intermediating transmission of the content and is also displaying the content on a separate display panel connected to the CSB, then the window frame encapsulating the casted or slinged content on the separate display panel is also color-coded to match the window frame color of the content source device. Furthermore, a displayed audio mixer interface that can be associated with a plurality of window frames for a plurality of casted or slinged contents can be dynamically color-coded during its operation to match a particular window frame color that encapsulates a content currently undergoing audio and/or volume adjustment.

In one preferred method of dynamic window frame coloring implementation for casted or slinged contents among a plurality of electronic devices, assigning colors to URL's and rendering them at the graphics engine for both the end-user device and the CSB may be desirable. Furthermore, the color palette can be monitored to ensure that each colored window frame matching for each casted or slinged content remains unique to one particular color. If casting or slinging of a particular content is terminated, then a particular color that was previously assigned to the casting or the slinging of the particular content can be recycled into a fresh color palette pool for future color-coding assignments to future casting or slinging activities.

Various embodiments of the present invention provide several advantages over conventional solutions for conducting, controlling, and managing multimedia content sharing and transfers. One advantage of an embodiment of the present invention is uniquely providing a set of intuitive user gesture commands executed on an electronic device that enable simplified and seamless interoperability and multimedia data transfers among a plurality of electronic devices in a multiple display device environment. Furthermore, another advantage of an embodiment of the present invention is providing a novel intermediary set-top box called a "cast-sling box" (CSB) that uniquely incorporates multimedia contents casting, slinging, transcoding, rendering, and recording capabilities for seamless interoperability of various electronic devices in a multiple display device environment.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the claims presented herein.

What is claimed is:

1. A gesture-based multimedia casting and slinging command device comprising:
    a cast and sling processing module incorporating a user gesture interpreter, a sling gesture command encoder, and a cast gesture command encoder, wherein the user gesture interpreter determines a user's finger swipe-down gesture as a multimedia sling command from a targeted device to the gesture-based multimedia casting and slinging command device, and wherein the user gesture interpreter further determines the user's finger swipe-up gesture as a multimedia cast command to trigger multimedia content transmissions from the gesture-based multimedia casting and slinging command device to the targeted device, and wherein the cast and sling processing module is also configured to determine and process cast-to-sling-to-cast-to-sling and sling-to-cast-to-sling-to-cast cascaded commands involving multi-level-depth intermediary and multiple target devices;
    the sling gesture command encoder comprising circuitry configured to encode the multimedia sling command as a multimedia inbound transfer from the targeted device and a localized playback at the gesture-based multimedia casting and slinging command device, wherein an established line-of-sightedness between the gesture-based multimedia casting and slinging command device and the targeted device triggers an intelligent machine-determined selection of a highest throughput and uncompressed communication protocol for the multimedia inbound transfer, and wherein a lost line-of-sightedness between the gesture-based multimedia casting and slinging command device and the targeted device triggers an intelligent machine-determined seamless switchover to a next-best protocol that provides a second-highest data throughput under a current inter-device proximity between the gesture-based multimedia casting and slinging command device and the targeted device;
    the cast gesture command encoder comprising circuitry configured to encode the multimedia cast command as a multimedia content outbound transfer to the targeted device and a remote playback at the targeted device, wherein an increased inter-device proximity between the gesture-based multimedia casting and slinging command device and the targeted device during an execution of the multimedia cast command triggers an automatic activation of a third electronic device located near the targeted device to enhance a user's viewing experience, and wherein a worsened inter-device proximity between the gesture-based multimedia casting and slinging command device and the targeted device during the execution of the multimedia cast command triggers an automatic deactivation of the third electronic device located near the targeted device;
    a touchscreen sensor interface, a graphics unit, and a touchscreen display unit operatively connected to the cast and sling processing module to receive, convert, and transmit at least one of the user's finger swipe-down gesture and the user's finger swipe-up gesture as electrical signals to the cast and sling processing module; and
    a CPU or an APU connected to a memory unit, the touchscreen sensor interface, the graphics unit, the touchscreen display, and the cast and sling processing module, wherein the CPU or the APU is further configured to execute one or more components from the cast and sling processing module.

2. The gesture-based multimedia casting and slinging command device of claim 1, further comprising at least one of a power management unit, a peripheral device, sensor, and external communication interface, a digital signal processing unit for cloud server access, an audio recording and processing unit, and a camera processing unit.

3. The gesture-based multimedia casting and slinging command device of claim 1, wherein the targeted device is a television, a cast-sling box (CSB), a portable electronic device with a display panel, or an audio output device.

4. The gesture-based multimedia casting and slinging command device of claim 1, wherein the gesture-based multimedia casting and slinging command device is a smart phone, a tablet computer, a notebook computer, a cast-sling box (CSB), or another electronic device that executes a user gesture interface application associated with the user gesture interpreter in the cast and sling processing module.

5. The gesture-based multimedia casting and slinging command device of claim 4, wherein the user gesture interface application is an Android mobile app, an Apple mobile app, a PC-compatible application, or a MAC OS-compatible application.

6. The gesture-based multimedia casting and slinging command device of claim 1, wherein the user gesture interpreter in the cast and sling processing module additionally determines the user's finger swipe-left gesture as an audio content sling command and the user's finger swipe-right gesture as an audio content cast command.

7. The gesture-based multimedia casting and slinging command device of claim 1, wherein the gesture-based multimedia casting and slinging command device and the targeted device are intermediated by a cast-sling box (CSB), which transcodes or relays the multimedia sling command, the multimedia cast command, or multimedia data between the gesture-based multimedia casting and slinging command device and the targeted device.

8. The gesture-based multimedia casting and slinging command device of claim 1, wherein the targeted device is a cast or sling command-recipient device and wherein the targeted device incorporates a user gesture command receiver, a sling gesture command decoder, and a cast gesture command decoder to decipher, comply with, or deny the multimedia sling command or the multimedia cast command from the gesture-based multimedia casting and slinging command device.

9. The gesture-based multimedia casting and slinging command device of claim 1, wherein the targeted device and the gesture-based multimedia casting and slinging command device are configured to communicate data via at least one of a wireless local area network, a cellular network, a wide-area network, a satellite network, a wired network, or a peer-to-peer direct connection.

10. The gesture-based multimedia casting and slinging command device of claim 1, wherein the targeted device is selected among a plurality of available target devices by a direct line of sight to the targeted device indicated by the user's finger swipe-down gesture for the multimedia sling command or the user's finger swipe-up gesture for the multimedia cast command on the gesture-based multimedia casting and slinging command device.

11. The gesture-based multimedia casting and slinging command device of claim 1, wherein the localized playback at the gesture-based multimedia casting and slinging command device, or the remote playback at the targeted device involves a transfer of streaming and playing audio/video (AV), graphical, or photographic multimedia contents from one device location to another device location.

* * * * *